United States Patent [19]

Park

[11] Patent Number: 5,357,187

[45] Date of Patent: Oct. 18, 1994

[54] AUTOMATIC CONTINUOUS RAPID CHARGING CIRCUIT FOR RECHARGEABLE BATTERIES, AND METHOD THEREOF

[75] Inventor: Bum-chul Park, Seoul, Rep. of Korea

[73] Assignee: SamSung Electronics Co., Ltd., Suwon, Rep. of Korea

[21] Appl. No.: 785,906

[22] Filed: Jun. 4, 1991

Related U.S. Application Data

[63] Continuation of Ser. No. 395,491, Aug. 18, 1989, abandoned.

[30] Foreign Application Priority Data

Dec. 31, 1988 [KR] Rep. of Korea ............... 18094/1988

[51] Int. Cl.⁵ .............................................. H02J 7/04
[52] U.S. Cl. ....................................... 320/20; 320/21; 320/22
[58] Field of Search .................. 320/2, 19, 20, 21, 22, 320/35, 36, 39, 40, 23, 24

[56] References Cited

U.S. PATENT DOCUMENTS

| | | | |
|---|---|---|---|
| 4,639,655 | 1/1987 | Westhaver et al. | 320/20 X |
| 4,710,694 | 12/1987 | Sutphin et al. | 320/21 |
| 4,792,743 | 12/1988 | Tsujino et al. | 320/22 X |
| 4,849,682 | 7/1989 | Bauer et al. | 320/21 X |
| 4,855,663 | 8/1989 | Matsui et al. | 320/20 |

Primary Examiner—Kristine L. Peckman
Attorney, Agent, or Firm—Robert E. Bushnell

[57] ABSTRACT

An automatic, continuous and rapid charging circuit for a plurality of rechargeable batteries and method thereof are disclosed. There is provided a power supply section; a power source switching section for selectively supplying the charging voltage to one of a plurality of batteries; a switching control section for supplying switching control signals to said power source switching section; a battery detecting section; a charge completion detecting section; a display section for displaying the charging operation of the batteries; and a microcomputer for performing the overall control of the system. According to the method of the present invention, a plurality of batteries are sequentially detected as to their placing for charging, and are successively charged, by using a power supply with a power capacity required to charge only a single battery.

14 Claims, 3 Drawing Sheets

AUTOMATIC CONTINUOUS RAPID CHARGING CIRCUIT FOR RECHARGEABLE BATTERIES, AND METHOD THEREOF

This is a continuation of application Ser. No. 07/395,491 filed on Aug. 18, 1989, now abandoned.

FIELD OF THE INVENTION

The present invention relates to a charging circuit for rechargeable batteries and a method thereof, and particularly, to a circuit for automatically, continuously and rapidly charging a plurality of rechargeable batteries, and a method thereof.

BACKGROUND OF THE INVENTION

In the conventional rapid charging circuits for rechargeable batteries (to be called hereinafter "batteries"), temperature-sensing or $-\Delta V$ (minus delta V) methods have been used. However, the known rapid charging circuits using these methods can rapidly charge only one battery at a time. Further, U.S. Pat. No. 4,571,533 (dated Feb. 18, 1986) discloses an automatic charging apparatus for charging a battery in a rate proportionate to the voltage level of the battery. This charging apparatus is provided with a monitoring device for generating light signals to indicate the voltage level the battery. However, this circuit also has the disadvantage that, if a plurality of batteries are to be charged continuously and rapidly by means of this circuit, the individual battery has to be replaced each time the charging of a battery is completed. Meanwhile, if a plurality of batteries are to be simultaneously charged, then the power supply capacity has to be increased by as many times as the number of the simultaneously charged batteries, and also, a charge control circuit comes to be needed which causes an increasing of the manufacturing cost of the charging circuit.

SUMMARY OF THE INVENTION

Therefore, it is the object of the present invention to provide a circuit capable of charging automatically, continuously and rapidly a plurality of batteries using a power supply with a power capacity required to charge only a single battery, and to provide a method thereof.

In achieving the above object, the circuit according to the present invention comprises a power supply section for supplying the charging voltage for batteries; a power source switching section for selectively supplying the charging voltage of the power supply section to at least one of the plurality of batteries in accordance with a switching control signal; a switching control section for supplying said switching control signals to the power source switching section in such a manner that the charging voltage applied into the power source switching section in accordance with charge mode control signals and battery selecting signals should be successively applied to at least one of the batteries to be charged; a battery detecting section for outputting a battery detection signal after making detections as to whether any one of a plurality of batteries is inserted; a charge completion detecting section for detecting the charge completion state for any one of the batteries receiving the charge voltage after being selected by the power source switching section; a display section for displaying the charging operation of the battery receiving the charge voltage from the power source switching section based on a predetermined display control signal from a microcomputer; and a microcomputer for supplying the charge mode control signal and the battery selecting signal to the switching control section upon inputting of a charge start signal, for supplying the display control signal to the display section, and for successively outputting the battery selecting signal in accordance with the battery insertion detection signal of the battery detecting section and in accordance with the charge completion signal of the battery charge completion detecting section.

The automatic, continuous and rapid charging method for rechargeable batteries according to the present invention comprises a first step for checking the input state of the charge start signal at the initial stage in which the power source is disconnected from the plurality of batteries;

a second step for checking the loading of a first battery, and for supplying the charge voltage to the first battery upon inputting of the charge start signal;

a third step for switching the charge voltage to a second battery upon detection of the non-existence of the first battery in the second step, and for checking the loading of the second battery;

a fourth step for alternately and repeatedly checking the charge completion state of the first battery and the loading of the first battery in the case where the existence of the first battery is detected in the first step;

a fifth step for turning the battery charge voltage to the second battery and for checking the placing of the second battery in the case where the charging of the first battery is completed or no first battery is found in the fourth step;

a sixth step for jumping to the initial state of the first step in the case where no second battery is detected in the third and fourth steps, and for checking alternately and repeatedly the charge completion state and the existence of the second battery in the case where a second battery is detected in the third and fourth steps; and a seventh step for continuing the charging in the case where a second battery is detected and the charging is not found to be completed as the result of the repeated checking in the sixth step, and for jumping to the initial stage of the first step to terminate the charging in the case where either a second battery is non-existent or the charging is found to be completed as the result of the repeated checking in the sixth step.

BRIEF DESCRIPTION OF THE DRAWINGS

The above object and other advantages of the present invention will become more apparent by describing the preferred embodiment of the present invention in more detail with reference to the attached drawings in which.

DESCRIPTION OF THE PREFERRED EMBODIMENTS

Figure 1:
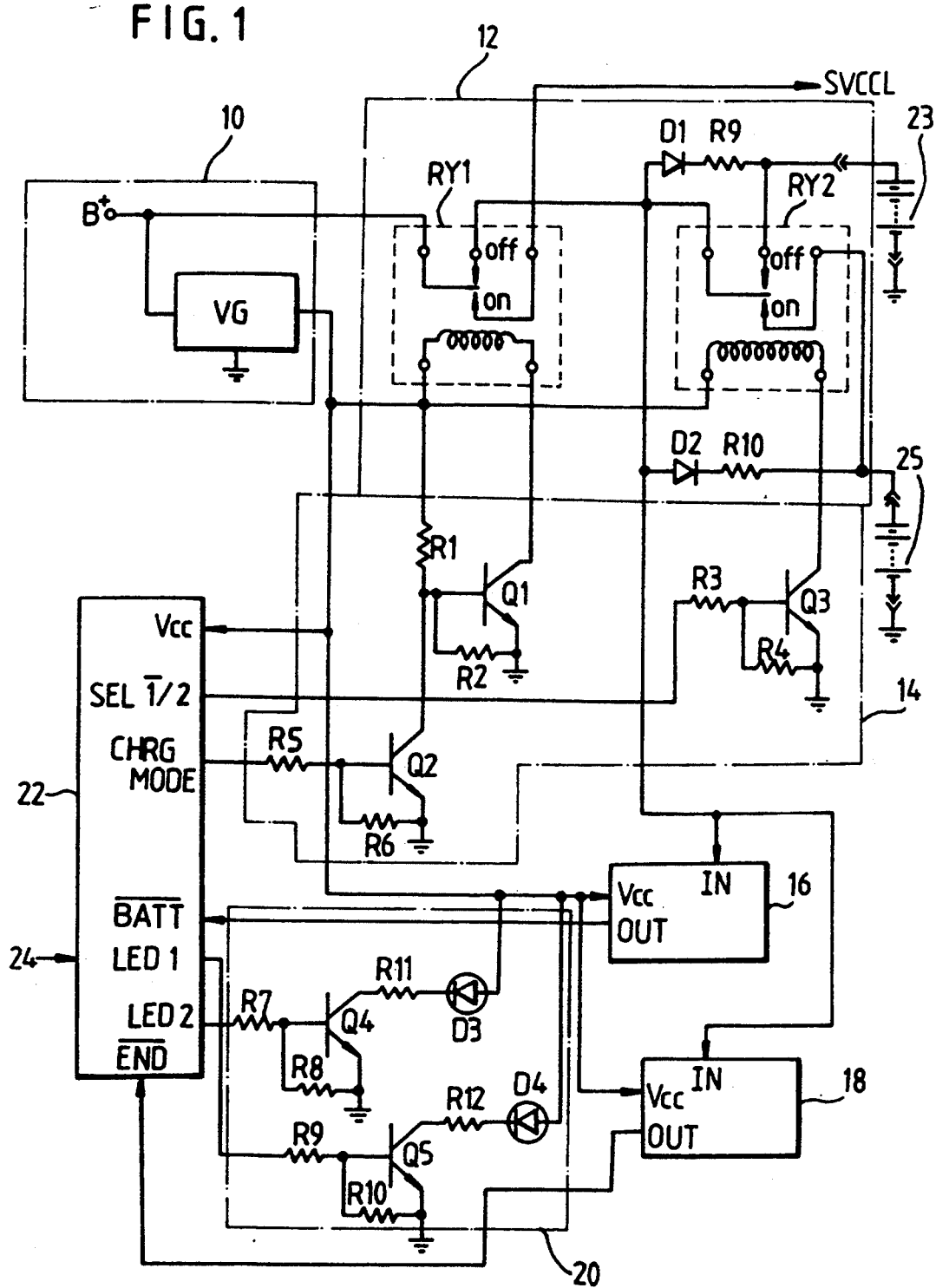
FIG. 1 illustrates the circuit according to the present invention.

The automatic, continuous and rapid battery charging circuit according to the present invention as shown in FIG. 1 comprises a power supply section 10 for supplying a charging voltage B+ and a circuit operating voltage Vcc which is produced from the charging voltage B+ through a voltage regulator VG; a power switching section 12 consisting of a first relay RY1, a second relay RY2, diodes D1, D2, and resistors R9, R10, and for selectively supplying the charging voltage to B+ one of a first and second batteries 23, 25 in accordance with switching control signals; a switching control section 14 consisting of resistors R1-R6 and transistors Q1-Q3, and for selectively driving the first and second relays RY1, RY2 in accordance with the charging mode control signals and the battery selecting signals; a battery detecting section 16 for detecting the loading state of the first battery 23 and the second battery 25; a charge completion detecting section 18 for controlling the rapid charging by inputting the battery charge voltage of the power source switching section 12, and for detecting the completion of the charging of the first or second batteries 23, 25; a display section 20 consisting of resistors R7-R9, light emitting diodes D3, D4 and transistors Q4, Q5, for displaying the charge operation of the battery in accordance with the display control signals; and a microcomputer 22 for receiving the battery loading detection signal from the battery detecting section 16 and the charge completion signal from the charge completion detecting section 18, and for outputting charge mode control signals, charge state display control signals, and battery selecting signals based on the predetermined program.

Figure 2:
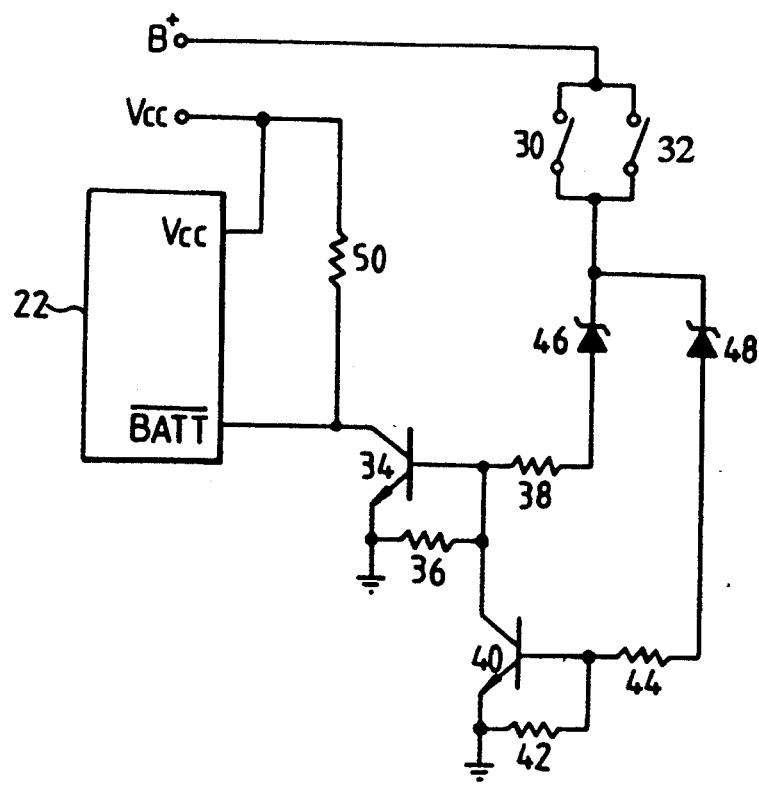
FIG. 2 shows a detailed circuit of the battery detecting section of FIG. 1.

FIG. 2 is a detailed illustration of the battery detecting section 16 of FIG. 1. In the drawing, switches 30, 32 are respectively switched over upon loading of the first and second batteries 23, 25, while zener diodes 46, 48 are respectively for detecting low and high voltages.

Reference numerals 34, 40 indicate switching transistors, while 36, 38, 42, 44 indicate current limiting resistors.

The circuit of FIG. 2 operates to detect the loading of the batteries through mechanical actuations, and if any one of the first and second batteries 23, 25 are inserted, the corresponding one of the switches 30,32 will be turned on.

In the case where a voltage B+ of a certain range is impressed by both the low voltage detecting zener diode 46 and the high voltage detecting zener diode 48, that is, the case where a voltage B+ higher than the zener voltage of the zener diode 46 and lower than the zener voltage of the zener diode 48 is impressed, if the switch 30 or the switch 32 is turned on, then the transistor 40 will be turned off, and the transistor 34 will be turned on, with the result that a battery detecting signal of a low level will be supplied to the $\overline{BATT}$ terminal of the microcomputer 22.

As above, when a battery detecting signal in the form of an active low signal is input, the microcomputer 22 will recognize the loading or insertion of a battery.

Figure 3:
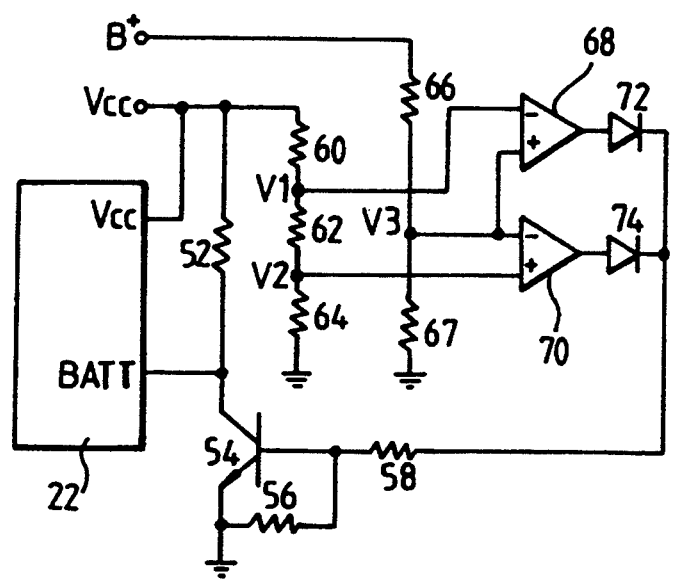
FIG. 3 shows another, modified circuit of the battery detecting section of FIG. 1.

FIG. 3 illustrates another embodiment of the battery detecting section 16 of FIG. 1, with voltage dividing resistors 60-67, a level comparator 70, diodes 72, 74 and a switching transistor 54, and is to detect the battery loading state based on the variations of the electrical parameter instead of mechanical actuations.

In addition to the function of detecting the battery loading state, the circuit of FIG. 3 functions to check abnormal state of the battery to be charged. The charge voltage input terminal IN of the battery detecting section 16 of FIG. 3 is electrically connected through a movable contact of the second relay RY2 to one of fixed contacts which are respectively connected to one of anodes of the first battery 23 and the second battery 25. Actually, the level of the charge voltage B+ is higher than the rated voltage of the battery, and therefore, if the first or second battery 23,25 is installed to the proper position, the input terminal of FIG. 3 will show a voltage drop to a level lower than when no battery is inserted. Therefore, due to the voltage variation of the input terminal IN, the node voltage V3 between the voltage dividing resistors 66, 67 will be also varied. The relationship between the node voltage V3, and the higher and lower reference voltages V1,V2 which are obtained through the voltage dividing resistors 60,62,64 from the operating voltage Vcc supplied from the voltage regulator of the power supplying section 10 will be described below.

If the value of the node voltage V3 for the case of non-insertion of a battery is V3h, and that the value of the node voltage V3 for the case of battery insertion is V3l, the resistance values of the voltage dividing resistances 60-67 will be decided in such a way that the following formulas should be satisfied:

$$V3h > V1, V2 < V3l < V1$$

In the case of V3h > V1 > V2, the comparator 68 will output a high level signal, and the comparator 70 will output a low level signal, so that the transistor 54 will be turned on, and that a low signal will be supplied to the terminal $\overline{BATT}$ of the microcomputer 22. As a result, the microcomputer 22 will be logically operated in a contrary manner compared with the case of the embodiment of FIG. 2, to recognize the loading state of a battery.

Meanwhile, in the case of V2 < V3l < V1, the comparator 68 will output a low level signal, and the comparator 70 will output also a low level signal, so that the transistor 54 will be turned off, and that a battery detecting signal in the form of an active high signal will be supplied to the terminal $\overline{BATT}$ of the microcomputer 22. As a result, the microcomputer 22 will recognize the battery loading state.

Moreover, as for an abnormal case, when a rechargeable battery having a storage voltage below the end voltage which disables the recharging of the battery is inserted, the battery comes to have almost a short circuit state, and the value of the node voltage V3 drops below the lower reference voltage V2.

As a result, the comparator 68 will output a low level signal, and the comparator 70 will output a high level signal, so that the transistor 54 will be turned on, and that a low level signal will be supplied to the terminal $\overline{BATT}$ of the microcomputer 22.

Thus, even if a battery is loaded into the proper place, if a low signal which indicates an unloading state of a battery is supplied to the terminal $\overline{BATT}$ of the microcomputer 22, then the microcomputer 22 recognizes it as an abnormal state, and will output a series of pulses through the terminal of the LED1 or LED2 of FIG. 1, so that the light emitting diode D3 or D4 should be flickered thereby indicating an abnormal state.

As another abnormal state, if a battery having an overvoltage which is higher than the supplied charge voltage B+ is installed, then the value of the node voltage V3 will satisfy the relationship V3>V1>V2, so that the transistor 54 will be turned on, and that a low level signal will be supplied to the terminal BATT of the microcomputer 22. Accordingly, in the same manner as the above abnormal state detecting procedure, the microcomputer 22 will detect the abnormal state and will display it.

Figure 4:
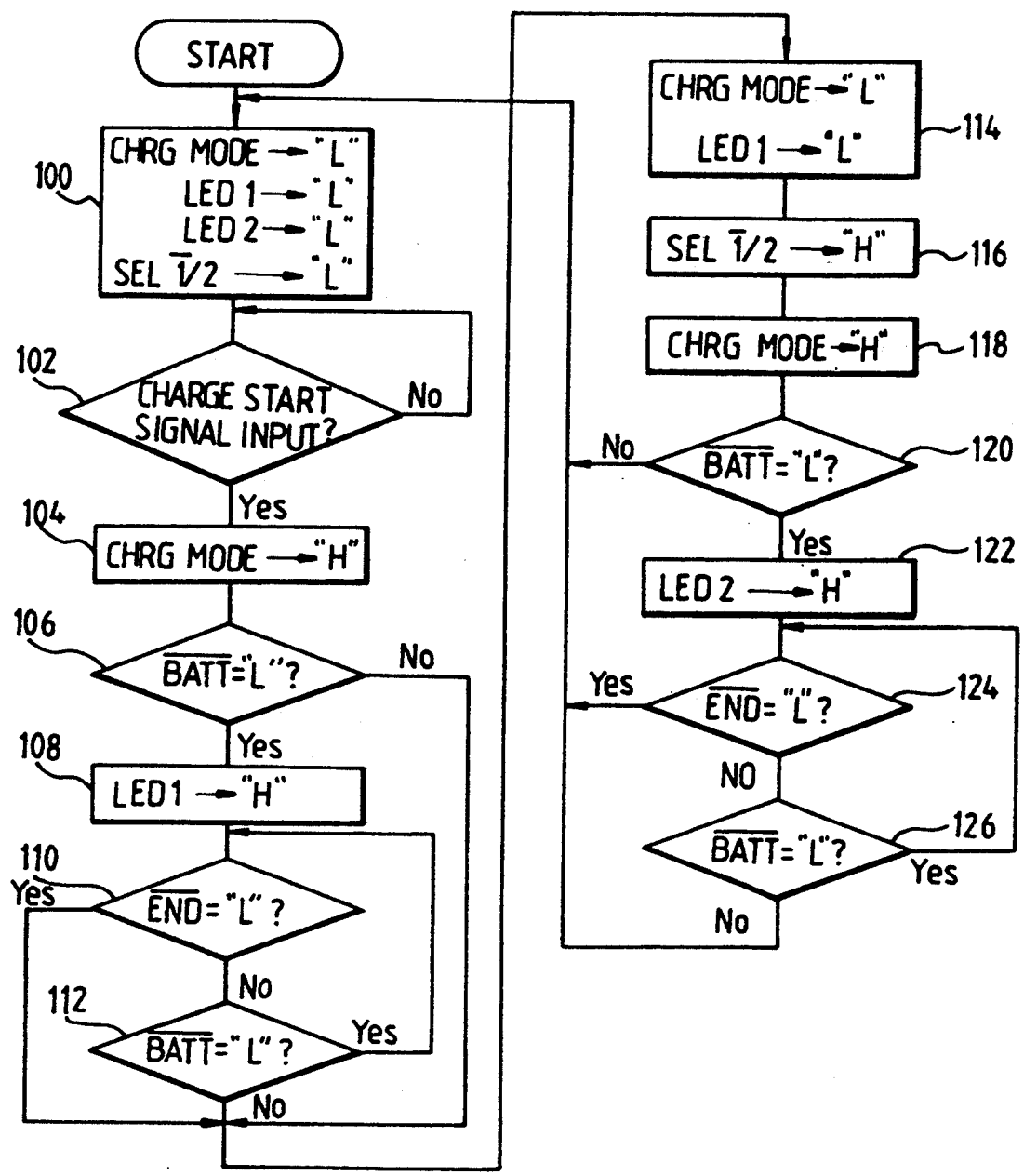
FIG. 4 is a flow chart showing the sequence of the operations of the circuit according to the present invention.

FIG. 4 is a flow chart for the automatic continuous rapid battery charging method according to the present invention. The battery charging operations of the charging circuit constituted as above will now be described referring to FIG. 4.

First, the power supply section 10 will supply the circuit operating power voltage Vcc to the respective sections, while the microcomputer 22 will output low signals to a charge mode terminal CHRG MODE, to the display signal output terminals LED1, LED2, and to a battery selecting terminal SEL $\frac{1}{2}$ in the step 100. The microcomputer 22 will check as to whether a charge start signal is input through a line 24 in the step 102, and if there is no such an inputting, then the output state of the step 100 will be maintained.

Thus, if the charge mode terminal CHRG MODE of the microcomputer 22 has a low level, then the transistor Q2 will be turned off, and the transistor Q1 will be turned on, so that the first relay RY1 will be turned on, and that the power source B+ will be applied to the power source supply line SVCCL for the main electric and electronic apparatus (not shown).

If a charge start signal of a low level is input through the line 24 under the above-described condition, then the microcomputer 22 will output a high voltage through the charge mode terminal CHRG MODE at the step 104. Thus, the transistor Q2 will be turned on, and the transistor Q1 will be turned off, so that the first relay RY1 will be turned off, and that the charge voltage B+ will be supplied to the second relay RY2.

The battery selecting terminal SEL $\frac{1}{2}$ of the microcomputer 22 will initially have a low level, and therefore, the transistor Q3 is turned off. Accordingly, the second relay RY2 is turned off, and the charge voltage B+ supplied to the second relay RY2 will be applied to the first battery 23.

Meanwhile, the battery detecting section 16 will detect the battery loading state based on the principles of FIG. 2 or 3. In the case of the battery detecting means being constructed to generate an active low signal for the microcomputer 22 as shown in FIG. 2, if a battery is loaded in a proper place, it will output a low signal.

The microcomputer 22 which has output a charge mode signal of a high level at the step 104 will make a judgement at the step 106 as to whether the signal of the terminal $\overline{\text{BATT}}$, i.e., the output of the battery detecting section 16, has a low level.

If it has a low level, then the microcomputer 22 will output a high signal to the display signal output terminal LED1 in order to turn on the transistor Q5, and thus, the light emitting diode D4 will be turned on to display the fact that the first battery 23 is being charged.

If the charge voltage B+ begins to be charged to the first battery 23 as described above, then the charge completion detecting section 18 based on the known type of $-\Delta V$ sensing will enter into the charge mode to help the rapid charging of the first battery 23. If the charging of the first battery 23 is completed through the charging operation of a predetermined duration, then the output of the charge completion detecting sensing section 18 will have a low level, while the microcomputer 22 will sense the charge completion of the first battery 23 through the detection at the step 110, and will output low signals to both the charge mode terminal CHRG MODE and the display signal terminal LED1 at the step 114, so that the charging for the first battery should be disconnected, and that the light emitting diode D4 for indicating the charging state of batteries should be turned off.

On the other hand, when the charge voltage B+ is being applied to the first battery 23, if the battery detecting section 16 can not detect the loading state of the first battery, that is, if a high signal is output due to the non-existence of the first battery 23, then the transistor Q2 will be turned off and the transistor Q1 will be turned on owing to the detecting operation of the step 106 and the operation of the step 114, with the result that the first relay RY1 will be turned on, and that the supply of the charge voltage B+ to the second relay RY2 will be disconnected.

In the case where the first battery 23 is removed intentionally by the user during the charging of the battery 23, the charging operation has to be transferred to the second battery 25. Therefore, after the charge completion state is checked at the step 110, a check is made at the step 112 as to whether the first battery 23 is removed.

If the removal of the battery is confirmed ($\overline{\text{BATT}}$=H), then the operation will also be transferred to the step 114. Therefore, whether the charging of the first battery 23 is completed or the first battery is removed during the charging, the charging function will be transferred to the second battery 25.

Meanwhile, if the microcomputer 22 carries out the step 114 of FIG. 4, then the first relay RY1 will be turned on, and therefore, the power source B+ will be disconnected from the input terminal IN of the battery detecting section 16 to reset it. Then, after carrying out the step 114, the microcomputer 22 will output a high signal to the battery selecting terminal SEL $\frac{1}{2}$ at the step 116 to turn on the transistor Q3. Then, the second relay RY2 is turned on to be connected to the second battery 25.

After carrying out the step 116, the microcomputer 22 will output a charge control signal of a high level to the charge mode terminal CHRG MODE at the step 118, so that the first relay RY1 should be turned off. Therefore, the power source B+ will be supplied to the second battery 25, and the charge voltage B+ will be supplied to both the battery detecting section 16 and the charge completion detecting section 18 upon turning-off of the first relay RY1. Thus, the battery detecting section 16 will detect the battery loading state, and will output the resultant detection signal to the microcomputer 22, while the charge completion detecting section 18 will shift to the rapid charging mode to rapidly charge the second battery 25.

After carrying out the step 118, the microcomputer 22 will check at the step 120 as to whether the terminal $\overline{\text{BATT}}$ has a low level. If the second battery 25 is loaded, the terminal $\overline{\text{BATT}}$ will be at a low level, and therefore, the microcomputer 22 will send a high signal to the display signal output terminal LED2, so that the light emitting diode D4 should be turned on to indicate that the second battery 25 is being charged.

Then, if the charge completion state for the second battery 25 is detected by the function of the charge completion detecting section 18 based on the known type of $-\Delta V$ sensing, an output signal of a low level will be input into the terminal $\overline{\text{END}}$ of the microcomputer 22. Then the completion of the charging is recognized at the step 124, and the operation returns to the step 100.

If the second battery 25 is not loaded at all, then the checking operation at the step 120 will make the operation return to the step 100 in which the initial operating procedure is carried out. On the other hand, if the battery is removed by the user in the process of charging, then the checking operation at the step 126 will make the function return to the step 100 where an initial mode will be set.

When any one of the two batteries 23, 25 completes the charging, the diode D1 and the resistor R9 or the diode D2 and a small resistor R10 will supply the current, thereby preventing the discharge of the electric power from the charged battery.

As described above, according to the charging system of the present invention in which a simultaneous loading of the two batteries, for example, are possible, when the charge start signal is supplied after the applying of the power source, an automatic switch-over for selection of the first or second battery 23, 25 is possible, and if any one of the batteries is detected, then a rapid charging is carried out, the charging operation being automatically terminated upon completion of the charging operation.

In the above description for the present invention, only two batteries were exemplarily presented, but, if the power switching section 12, the switching control section 14 and the control port of the microcomputer 22 are expanded, three or more batteries can be automatically, continuously and speedily charged.

As described above, the circuit according to the present invention makes it possible to charge a plurality of batteries automatically, continuously and speedily using a power capacity enough to charge a single battery, and therefore, an efficient charging system is obtained with a low manufacturing cost.

What is claimed is:

1. A process for sequentially charging a plurality of batteries which are rechargeable, the process comprising the steps of:
    beginning the process by repeatedly checking for a start signal to initiate charging, said repeated checking occurring until said start signal is received;
    applying a current flow from a single power supply to a first battery of the plurality of batteries;
    determining whether said first battery is discretely coupled to a first terminal of a plurality of terminals;
    if the first battery is not discretely coupled to said first terminal, disconnecting the current flow to the first battery;
    determining whether charging of the first battery is complete;
    if charging of the first battery is not complete, again determining whether the first battery is discretely coupled to said first terminal, continuing to charge the first battery if said first battery continues to be discretely coupled to said first terminal, and disconnecting the current flow to said first battery if said first battery is not discretely coupled to said first terminal;
    if charging of the first battery is complete, disconnecting the current flow to said first battery; and
    applying a current flow from said single power supply to a second battery of said plurality of batteries.

2. The process of claim 1, where the step of applying a current flow from said single power supply to a second battery is replaced by the steps of:
    determining whether the second battery is discretely coupled to a second terminal of the plurality of terminals;
    if the second battery is not discretely coupled to said second terminal, returning to the beginning step;
    applying a current flow from said single power supply to the second battery of said plurality of batteries; and
    determining whether charging of the second battery is complete.

3. The process of claim 1, further comprising the step of displaying a message when each of the plurality of batteries is being charged.

4. A process for sequentially charging a plurality of batteries which are rechargeable, comprising the steps of:
    beginning the process by checking for a start signal to start said charging, said checking occurring until said start signal is received;
    applying a current flow from a single power supply to a first battery of said plurality of batteries;
    determining whether said first battery is discretely coupled to a first terminal of a plurality of terminals;
    if the first battery is not discretely coupled to said first terminal, disconnecting the current flow to the first battery;
    determining whether charging of the first battery is complete;
    if the first battery is not completely charged, again determining whether the first battery is discretely coupled to said first terminal, continuing to charge the first battery if said first battery is coupled to said first terminal, and disconnecting the current flow to said first battery if said first battery is not coupled to said first terminal;
    if the first battery is completely charged, disconnecting the current flow to said first battery;
    determining whether a second battery of said plurality of batteries is discretely coupled to a second terminal of the plurality of terminals;
    if the second battery is not discretely coupled to said second terminal, returning to said step of beginning the process;
    applying a current flow from said single power supply to said second battery;
    determining whether charging of the second battery is complete;
    if the second battery is not completely charged, determining whether the second battery is coupled to said second terminal independently of any other battery of the plurality of batteries, continuing to charge the second battery if said second battery continues to be coupled to said second terminal, and returning to the beginning step if said second battery is not coupled to said second terminal; and
    if the second battery is completely charged, returning to the beginning step.

5. The process of claim 4, further comprising the step of displaying a message when each of the plurality of batteries is being charged.

6. A battery recharger for sequentially charging a plurality of rechargeable batteries, comprising:
   means for supplying a charging voltage and a circuit operating voltage, wherein said circuit operating voltage is produced from the charging voltage;
   switching means for selectively supplying the charging voltage to each of the plurality of rechargeable batteries;
   driving means for selectively driving the switching means to sequentially supply the charging voltage to said each of the plurality of rechargeable batteries;
   battery detecting means for determining whether said each of the plurality of rechargeable batteries is respectfully coupled to each of a plurality of terminals; and
   charge completion detecting means for determining whether charging of said each of the plurality of batteries is completed through a charging operation of a predetermined duration
   displaying means for displaying whether said each of the plurality of rechargeable batteries is being charged, said displaying means comprising:
   a first plurality of transistors, an emitter of each transistor of said first plurality of transistors being coupled to a reference potential,
   a plurality of light emitting diodes, a cathode of each light emitting diode of said plurality of light emitting diodes being respectively coupled to a collector of each transistor of said first plurality of transistors, and
   a first plurality of resistors.

7. The battery recharger of claim 6, further comprising a microcomputer, wherein said microcomputer:
   receives a signal from the battery detecting means, indicating whether said each of the plurality of rechargeable batteries is respectfully coupled to said each of the plurality of terminals;
   receives a signal from the charge completion detecting means, indicating whether charging of said each of the plurality of rechargeable batteries is completed through the charging operation of said predetermined duration; and
   generates control signals for controlling the switching means and the driving means.

8. The battery recharger of claim 6, wherein said battery detecting means comprises:
   a plurality of switches, an input of each switch of said plurality of switches being commonly coupled to the charging voltage;
   a second plurality of transistors, an emitter of each transistor of said second plurality of transistors being coupled to said reference potential;
   a plurality of diodes, an anode of each diode of said plurality of diodes being respectively coupled to a base of each transistor of said second plurality of transistors, and a cathode of each diode of said plurality of diodes being commonly coupled to an output of said plurality of switches; and
   a second plurality of resistors.

9. The battery recharger of claim 8, further comprising a microcomputer, wherein said microcomputer:
   receives a signal from the battery detecting means, indicating whether said each of the plurality of rechargeable batteries is respectfully coupled to said each of the plurality of terminals;
   receives a signal from the charge completion detecting means, indicating whether charging of said each of the plurality of rechargeable batteries is completed through the charging operation of said predetermined duration; and
   generates control signals for controlling at least the switching means and the driving means.

10. The battery recharger of claim 9, wherein one of said control signals of said microcomputer controls the displaying means.

11. The battery recharger of claim 6, wherein said battery detecting means comprises:
    a first set of serially coupled resistors for dividing the circuit operating voltage;
    a first node and a second node interleaved with said first set of serially coupled resistors;
    a second set of serially coupled resistors for dividing the charging voltage;
    a third node located between two resistors of said second set of serially coupled resistors;
    means for comparing a potential of the third node with a potential of the first node;
    means for comparing the potential of the third node with a potential of the second node; and
    means for controlling a current flowing to an output terminal of the battery detecting means, said output terminal of the battery detecting means corresponding to an output terminal of said comparing means.

12. The battery recharger of claim 11, further comprising a microcomputer, wherein said microcomputer:
    receives a signal from the battery detecting means, indicating whether said each of the plurality of rechargeable batteries is respectfully coupled to said each of the plurality of terminals;
    receives a signal from the charge completion detecting means, indicating whether charging of said each of the plurality of rechargeable batteries is completed through the charging operation of said predetermined duration; and
    generates control signals, wherein said control signals control the switching means and the driving means.

13. An automatic, continuous and rapid charging circuit for a plurality of rechargeable batteries comprising:
    a power supply section for supplying a charging voltage for each of the plurality of rechargeable batteries;
    a circuit operating voltage produced from the charging voltage through a voltage regulator;
    a power source switching section including a first relay, a second relay, two diodes and two resistors, said power source switching section selectively supplying the charging voltage of said power supply section to one of the plurality of rechargeable batteries in accordance with a switching control signal;
    a switching control section including six resistors and three transistors, said switching control section providing said switching control signal in accordance with charge mode control signals and battery selecting signals supplied from a microcomputer;
    a battery detecting section including seven voltage dividing resistors, a level comparator, two diodes and a switching transistor, said battery detecting section outputting a battery detection signal after making detections as to whether said one of the plurality of batteries is inserted in the circuit, and for detecting a battery loading state based on variations of an electrical parameter;

a charge completion detecting section for detecting a charge completion state for said one of the plurality of rechargeable batteries receiving the charge voltage after being selected by said power source switching section;

a display section including three resistors, two light emitting diodes and two transistors, said display section displaying charging of said one of the plurality of rechargeable batteries receiving the charge voltage from said power source switching section based on a predetermined display control signal; and a microcomputer for supplying a charge mode control signal and a battery selecting signal to said switching control section upon inputting a charge start signal, and for supplying the predetermined display control signal to said display section, and for successively outputting a battery selecting signal in accordance with a battery loading detection signal of said battery detecting section and in accordance with a charge completion signal of said charge completion detecting section.

14. The charging circuit of claim 13, further comprised of said microcomputer:

receiving a signal from the battery detecting section, indicating whether said each of the plurality of rechargeable batteries is coupled to each of a plurality of terminals;

receiving a signal from the charge completion detecting section, indicating whether charging of said each of the plurality of rechargeable batteries is completed through a charging operation of a predetermined duration; and generating control signals, wherein said control signals control the power source switching section and the switching control section.

* * * * *